United States Patent [19]

Delacourt et al.

[11] Patent Number: 5,748,362
[45] Date of Patent: May 5, 1998

[54] FREQUENCY CONVERTER, WITH VERY HIGH EFFICIENCY, IN GUIDED OPTICS

[75] Inventors: Dominique Delacourt, Clamart; Jean-Patrick Truffer, Bures Sur Yvette; Dominique Papillon, Magny les Hameaux; Michel Papuchon, Villebon Palaiseau, all of France

[73] Assignee: Thomson-CSF, Paris, France

[21] Appl. No.: 693,221

[22] PCT Filed: Dec. 15, 1995

[86] PCT No.: PCT/FR95/01677

§ 371 Date: Aug. 21, 1996

§ 102(e) Date: Aug. 21, 1996

[87] PCT Pub. No.: WO96/20426

PCT Pub. Date: Jul. 4, 1996

[30] Foreign Application Priority Data

Dec. 23, 1994 [FR] France .................... 94 15588

[51] Int. Cl.$^6$ .......................................... G02F 1/39
[52] U.S. Cl. .................... 359/332; 359/326; 385/122
[58] Field of Search .................... 385/122; 359/326, 359/328, 332

[56] References Cited

U.S. PATENT DOCUMENTS 5,155,791 10/1992 Hsiung .................... 385/122
5,339,190 8/1994 Yamamoto et al. .................... 359/322
5,424,867 6/1995 Nihei et al. .................... 359/326
5,619,369 4/1997 Yamamoto et al. .................... 359/332
5,631,766 5/1997 Venhuizen et al. .................... 359/328

FOREIGN PATENT DOCUMENTS 5-267429 11/1993 Japan.
5-333391 12/1993 Japan.

*Primary Examiner*—John D. Lee
*Attorney, Agent, or Firm*—Oblon, Spivak, McClelland, Maier & Neustadt, P.C.

[57] ABSTRACT

The invention relates to a frequency converter comprising a guide and a non-linear medium (NLM) in which the condition of phase matching between non-linear polarization and created waves is satisfied locally. The object of the invention resides in an additional layer C lying on the medium (NLM), the refractive index of which is such that it increases the conversion yield, for conversion of the incident waves to the waves created within the guide. This layer may be a symmetrization layer whose index is close to the index of the medium (NLM). The conversion yield may be further increased by means of an intermediate layer $C_{ex}$ which lies between the layer C and the medium (NLM) and the index of which is close to that of the guide.

10 Claims, 11 Drawing Sheets

FREQUENCY CONVERTER, WITH VERY HIGH EFFICIENCY, IN GUIDED OPTICS

The field of the invention is that of optical frequency converters for which the waves are confined in a guide produced within a substrate having 2nd-order non-linear optical properties.

The various operations capable of being performed in a converter are summarised in the following table in which the optical frequencies of the incident or emitted waves are respectively designated by $\omega_i$ or $\omega_e$:

| | |
|---|---|
| Frequency doubling | $\omega_1 + \omega_1 \rightarrow \omega_e = 2\omega_1$ |
| Parametric fluorescence | $\omega_1 \rightarrow \omega_{e1} + \omega_{e2}$ |
| Sum of frequencies | $\omega_{i1} + \omega_{i2} \rightarrow \omega_{e3}$ |
| Difference of frequencies | $\omega_{i1} - \omega_{i2} \approx 3\, \omega_{e3}$ |

In order to obtain a high conversion efficiency, it is necessary to ensure the following two conditions:

The first condition relates to phase matching along the interaction length between the incident non-linear polarization induced by the incident illumination or illuminations and the wave or waves that this polarization has given rise to.

The second condition relates to the spatial overlap of the guided modes of the incident waves and of those created within the non-linear medium.

This second condition is difficult to satisfy fully, especially if the first condition relating to phase matching is provided artificially by the periodic modulation of a parameter involved in the non-linear interaction to compensate for the difference in propagation constant $\Delta k$ associated with the dispersion of the refractive index of the non-linear material in question.

This is because the techniques generally used for providing this periodic modulation and those used for producing the guide do not lead to an always satisfactory overlap of the guided modes in the region in which this periodic modulation is obtained, since inscribing a guide by a positive index difference, without adversely affecting the intrinsic non-linear parameter of the material, usually imposes small index differences which are not conducive to maximum confinement of the guided modes in the guide. Typically, the situation is as in the configuration illustrated in FIG. 1 in which the guided modes extend over a depth P into the substrate, whereas the periodic modulation is provided over a depth D, which is less than P.

In point of fact, to obtain the best possible conversion efficiency, it is important that there be a maximum overlap between the guided modes and the region in which the phase-matching condition is satisfied. If the guided modes propagate outside this region, part of the light energy is not used for interaction in the frequency-conversion phenomena.

Within the framework of a frequency doubler, it is usually sought to obtain overlap of the 1st-order (or fundamental) mode of the incident wave at $\lambda_1$ and of the 1st-order mode of the wave created at $\frac{1}{2}\lambda_1$, being in the direction Oz (indicated in FIG. 1). This is because, in the lateral direction Oy, overlap with the non-linear grating causes no problem given that the latter may be significantly wider than that of the guide.

In the case of a frequency converter of an optical parametric oscillator type, it is preferably sought to obtain overlap of modes of different orders. This is because the overlap of 2nd-order modes of the wave emitted at $\omega_i$ with the overlap of the 1st-order modes of the waves greater at $\omega_{e1}$ and $\omega_{e2}$ is facilitated.

In order to remedy this insufficiency in spatial overlap of the guided waves in the region in which the phase-matching condition is satisfied, the invention proposes to use a layer of a material of refractive index N, deposited on the surface of the non-linear material in which the phase-matching condition has been produced. More specifically, the subject of the invention is a frequency converter comprising a guide of refractive index $n_g$, supplied by one or more light waves of frequency $\omega_{in}$, also comprising a non-linear medium (NLM) of index $n_s$ (less than $n_g$) in which the condition for phase matching between the non-linear polarization generated by the incident waves and the created waves at frequencies $\omega_{em}$ is satisfied over a depth D of the non-linear medium by periodic modulation of a parameter involved in the non-linear interaction, the said depth being defined in a plane perpendicular to the axis of propagation of the incident and created waves, the said waves being confined in the two directions perpendicular to their axis of propagation, characterized in that:

the converter comprises a layer C lying at the surface of the non-linear medium and of refractive index N, such that it increases the spatial overlap, in the plane perpendicular to the axis of propagation of the incident and created waves, on the one hand of a non-linear polarization generated by the $k_i$th-order guided modes of the incident waves and on the other hand of the $l_i$th-order guided modes of the created waves, in a region lying above the depth D of the medium (NLM).

The frequency converter according to the invention may advantageously comprise a symmetrization layer $C_1$ whose refractive index is close to that of the medium (NLM) and less than $n_g$ so as to increase the spatial overlap of the non-linear polarization generated by the fundamental incident guided modes and of the fundamental guided modes of the created waves, especially when the frequency converter is a frequency doubler.

The frequency converter may in this case also comprise a layer $C_{ex}$ inserted between the layer $C_1$ and the medium (NLM), the refractive index $n_{eg}$ of the layer $C_{ex}$ being close to the index $n_g$ of the guide.

In fact, to increase the conversion efficiency further, the thickness of the guide may be artificially increased by depositing, between the symmetrization layer and the guide, a layer $C_{ex}$ of index close to that of the guide obtained by various possible technologies within the non-linear material since, when it is desired to confine guided modes within a guide, one of the possibilities consists in increasing the size of the guiding region. It is chosen to do this in the upper part of the guide in order not to accentuate the depth difference between P and D; thus an additional layer is added at the surface of the guide.

Preferably, the guide is inscribed in the non-linear medium (NLM) in the region lying above the depth D defined previously. Lateral confinement perpendicular to the direction of propagation of the waves and to the depth D may result from the production of the guide which is itself confined. However, when the difference between the index $n_{eg}$ and the index of the medium (NLM) is large enough it is possible not to have to inscribe a guide in the medium (NLM). The guide may then be obtained within a layer $C'_{ex}$ of index $n_g$ deposited on the medium (NLM), by means of a local additional thickness of the layer $C_1$ and/or of the layers $C_1$ and $C''_{ex}$ so as to define the two-dimensional confinement in a plane perpendicular to the direction of propagation of the guided modes at the layer $C_{ex}$/medium (NLM) interface.

According to another variant of the invention, the frequency converter according to the invention may comprise a layer $C_2$ whose refractive index is close to that of the guide so as to increase the spatial overlap of the non-linear polarization generated by the $k_i$th-order incident guided modes and of $l_j$th-order created guided modes, where $k_i \neq l_j$. In particular, this may be an optical parametric oscillator in which it is desired to obtain the overlap of a 2nd-order mode of an incident wave and of a 1st-order mode of a created wave. This is because it is no longer sought to use a symmetrization layer since, on the contrary, it is sought to exploit the disymmetry of the modes, the additional layer then being purely a layer making it possible to extend the guiding region. More specifically, in the case of overlap of the polarization created by a 2nd-order mode having in this case two lobes, it is desired to obtain overlap of one of the lobes with the lobe of the 1st-order mode of the created wave.

In this type of converter, the guide may advantageously be inscribed in the medium (NLM). It may also be produced within the layer $C_2$ by an additional thickness of this layer so as to define the two-dimensional confinement in a plane perpendicular to the direction of propagation of the guided modes.

The invention may be advantageously employed in the case of artificial phase matching (VPM), this being a particularly useful technique since it allows the use of materials which are highly efficient from a non-linear standpoint, even if the dispersion in their refractive index is considerable. This leads to the production of wavelengths especially in the blue, by frequency doubling in materials for which the phase-matching condition cannot be satisfied using conventional techniques. Typically, these may be materials such as $LiNbO_3$, $LiTaO_3$ or alternatively KTP, which exhibit high non-linearity's and which are, moreover, compatible with the technology of integrated optics.

The VPM is preferably obtained by periodically changing the sign of the non-linear coefficient in one of the aforementioned materials.

The invention will be easier to understand and other advantages will become apparent on reading the description which will follow, given in a non-limiting manner, and by virtue of the appended figures, in which.

Figure 5:
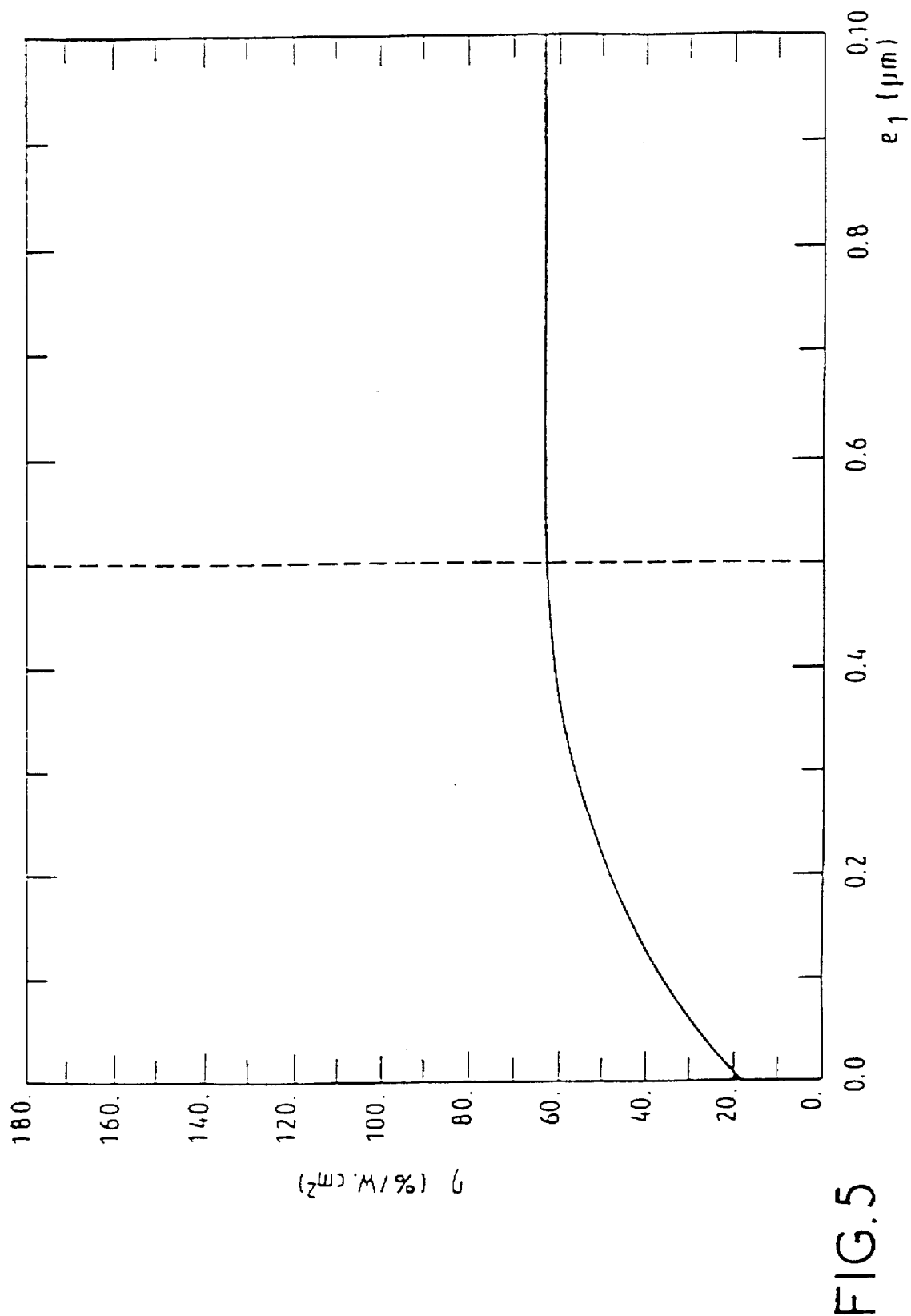
Figure 6:
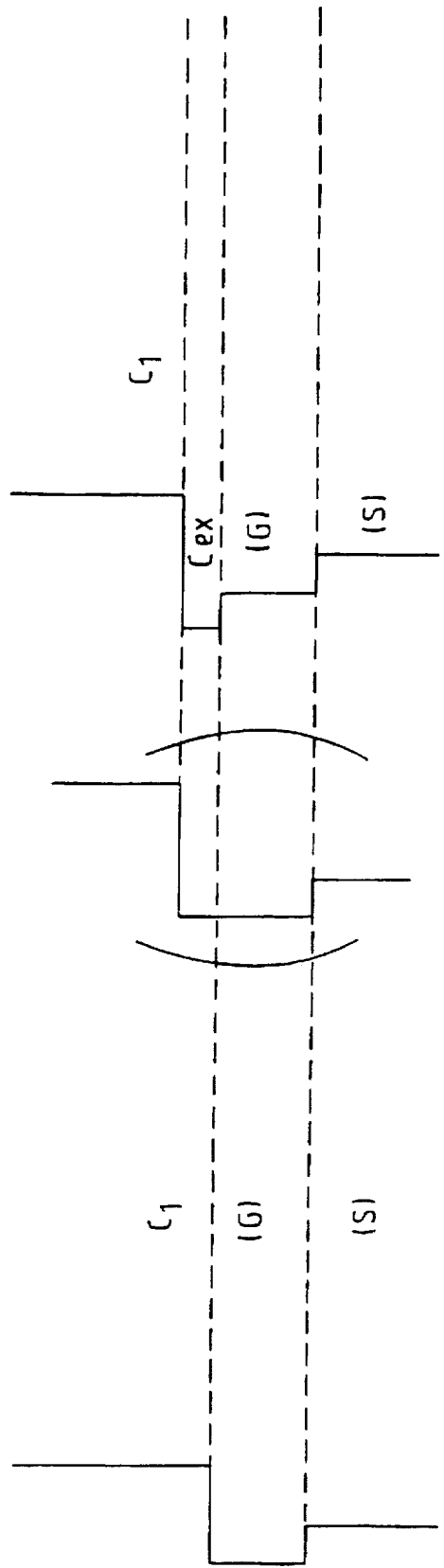
Figure 7:
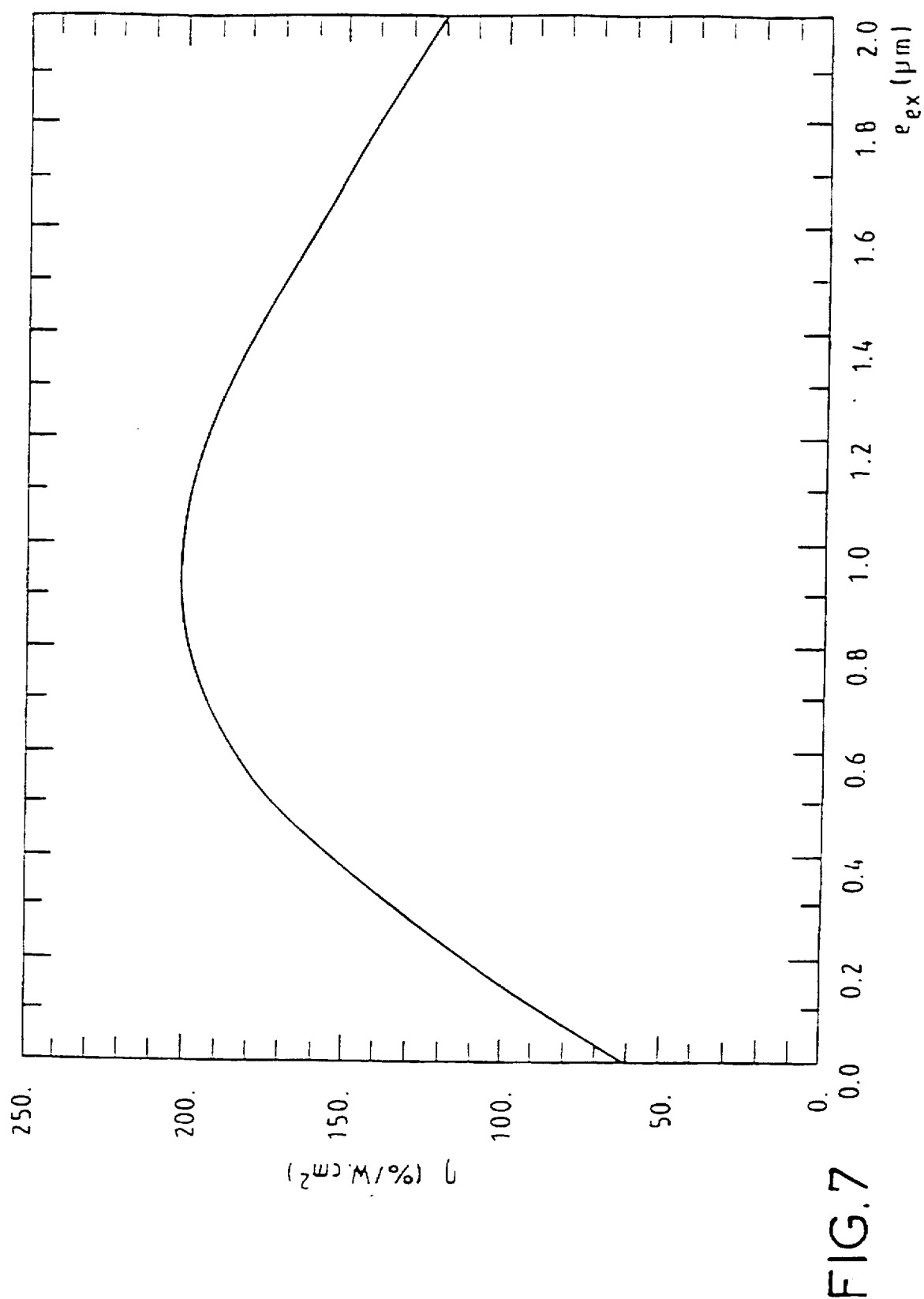
Figure 8:
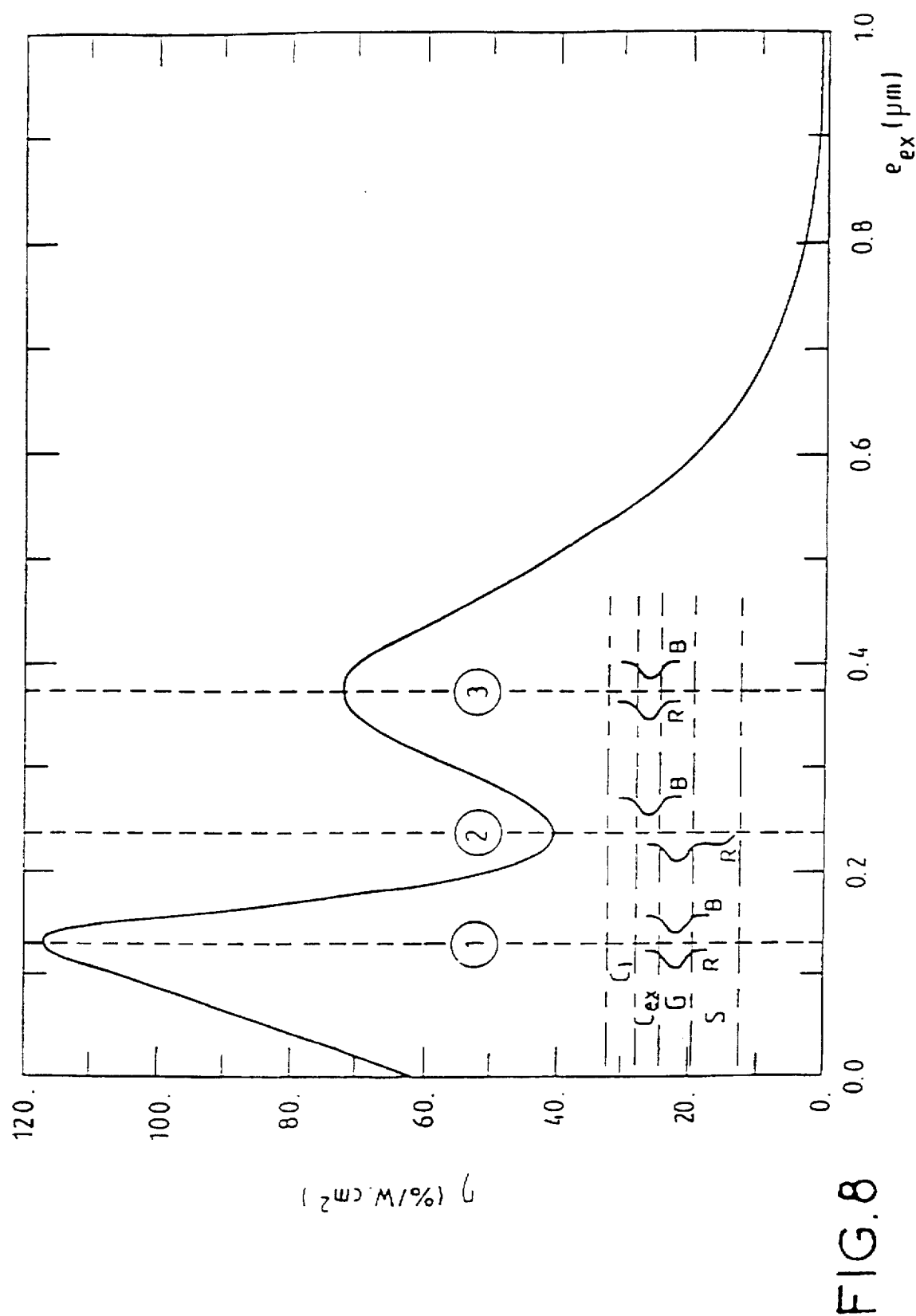
Figure 9:
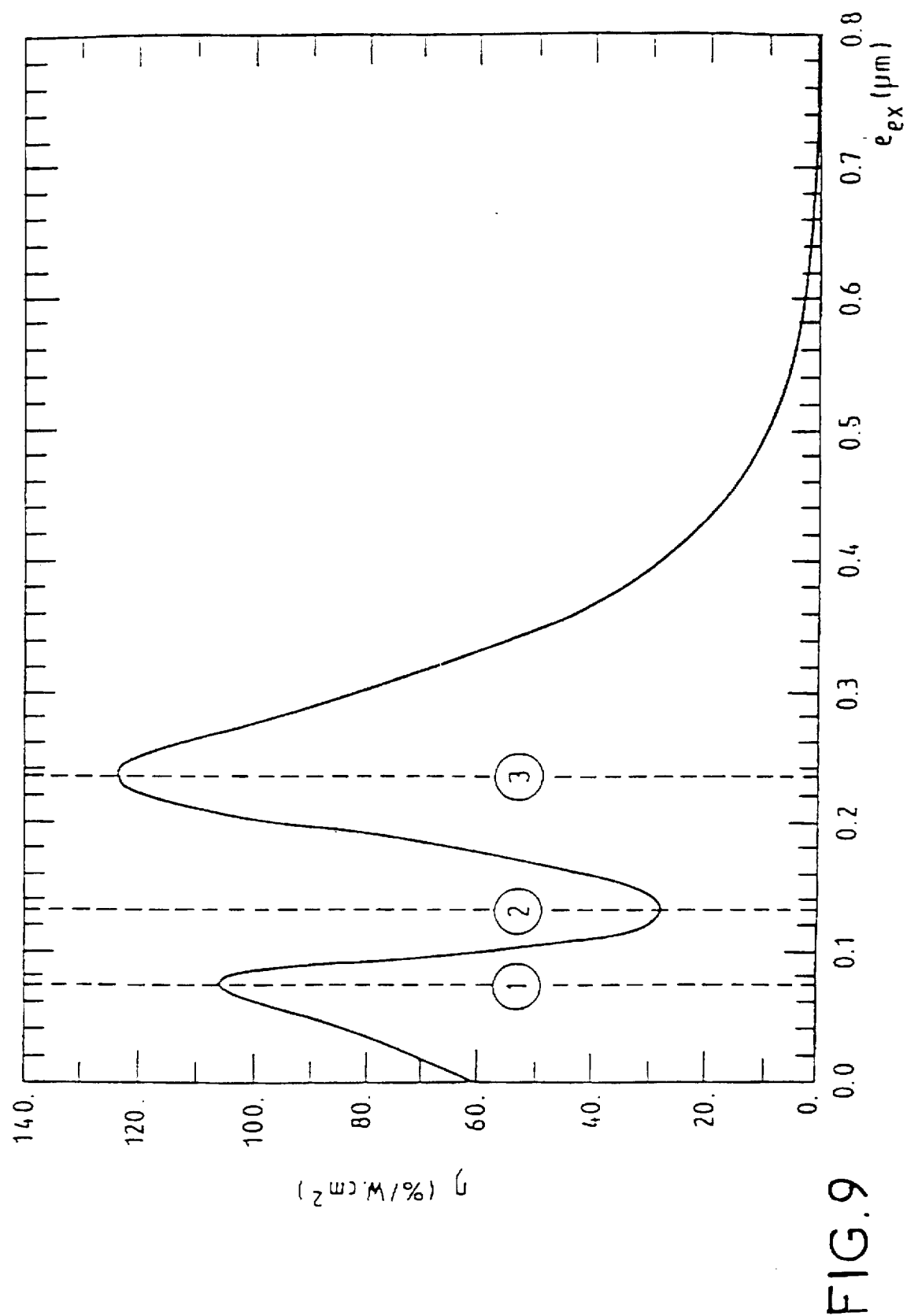
Figure 10:
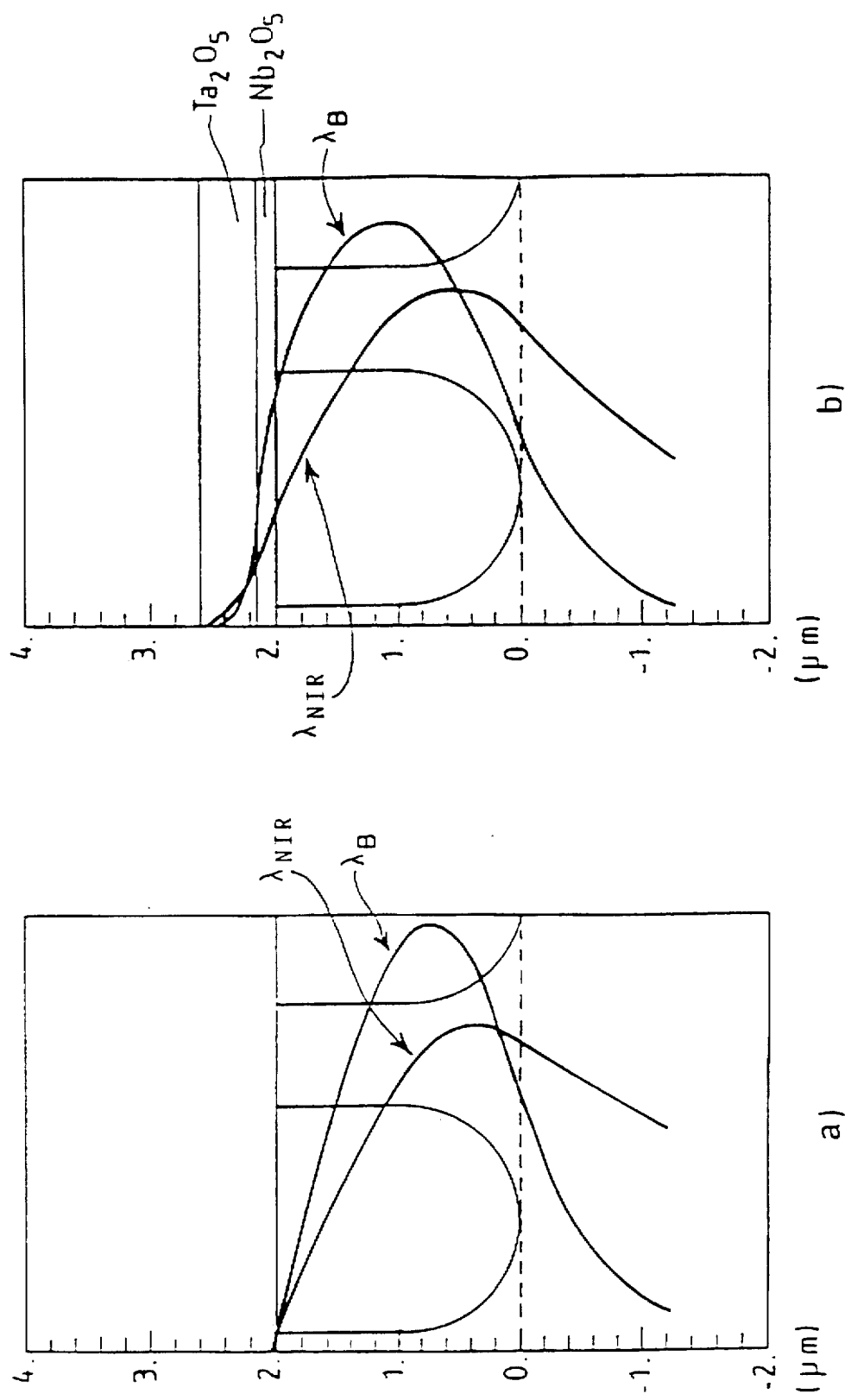
Figure 11:
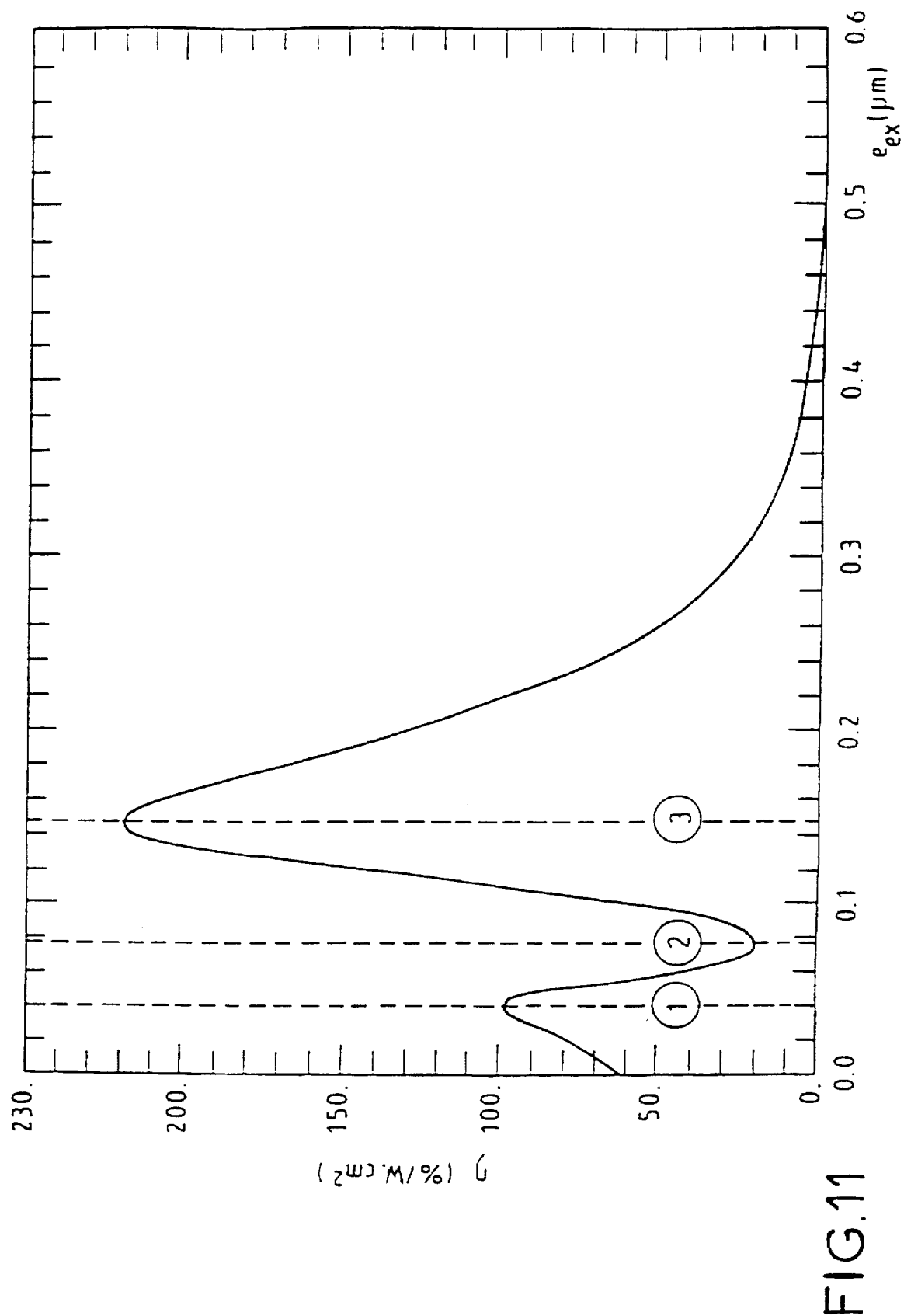
Figure 12:
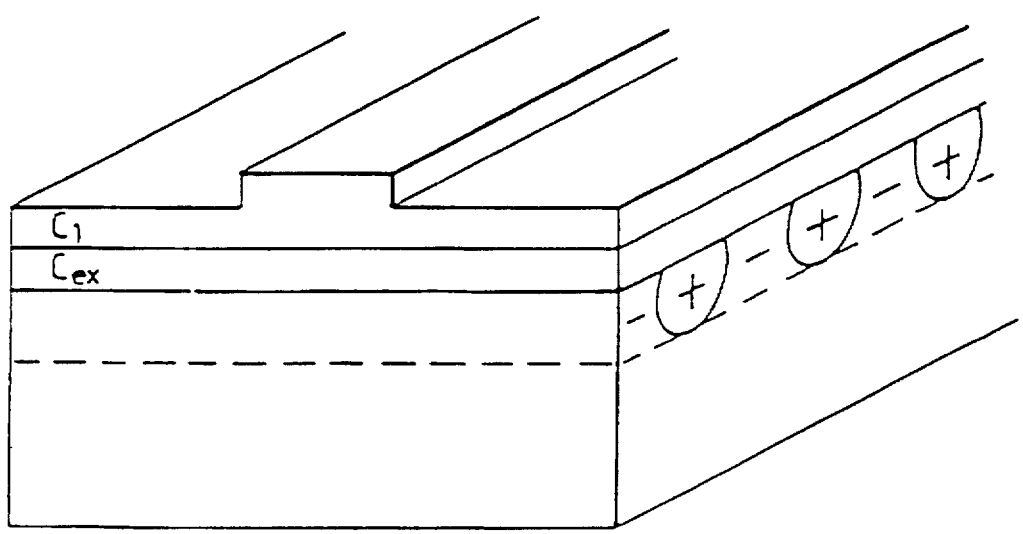

* a—the frequency converter does not include a symmetrization layer;

* b—the frequency converter includes a symmetrization layer whose refractive index is equal to that of the substrate;

* c—the frequency converter includes a symmetrization layer whose refractive index is less than that of the substrate;

FIG. 5 illustrates the variation in the conversion yield as a function of the thickness of the layer $C_1$ expressed in µm:

FIG. 6 illustrates various index profiles in the following cases:

* a—the frequency converter includes a symmetrization layer;

* b—the frequency converter includes a guide-extension layer of index equal to that of the guide and a symmetrization layer;

* c—the frequency converter includes a guide-extension layer of index greater than that of the guide, as well as a symmetrization layer;

FIG. 7 illustrates the variation in the conversion yield as a function of the thickness $e_{ex}$ of the guide-extension layer (profile b in FIG. 6);

FIG. 8 illustrates the variation in the conversion yield as a function of the thickness $e_{ex}$ (profile c in FIG. 6, with a small index difference between the guide and the guide-extension layer);

FIG. 9 illustrates the variation in the conversion yield as a function of the thickness $e_{ex}$ (profile c in FIG. 6 and a greater difference between the indices of the guide and of the guide-extension layer than in the example illustrated in FIG. 8;

FIG. 10 illustrates the profile of the electric fields and therefore the appearance of the 1st-order guided modes for the wavelengths $\lambda_{NIR}$ and $\lambda_B$;

* FIG. 10a relates to an example of a converter without an additional layer;

* FIG. 10b relates to an example of a converter with a symmetrization layer $C_1$ and a guide-extension layer $C_{ex}$;

FIG. 11 illustrates the conversion yield as a function of the thickness of the guide-extension layer for an example of a converter in which the refractive index difference between the non-linear medium and the guide-extension layer is 0.2; and FIG. 12 illustrates an example of a frequency converter according to the invention in which there is no guide inscribed in the medium (NLM), the guiding region being provided by a ridge within the layer $C_1$.

we will now describe the invention for the particular case of a frequency converter capable of generating a 1st-order guided mode in the blue by frequency doubling using a 1st-order guided mode in the near infra-red within a waveguide produced in a substrate.

To do this, materials such as $LiNbO_3$, $LiTaO_3$ or KTP may advantageously be used, in which the condition of virtual phase matching may be provided by the periodic change in sign of the highest non-linear coefficient ($d_{33}$), it being possible for this change to be obtained by reversing the direction of the ferroelectric polarization.

Figure 1:
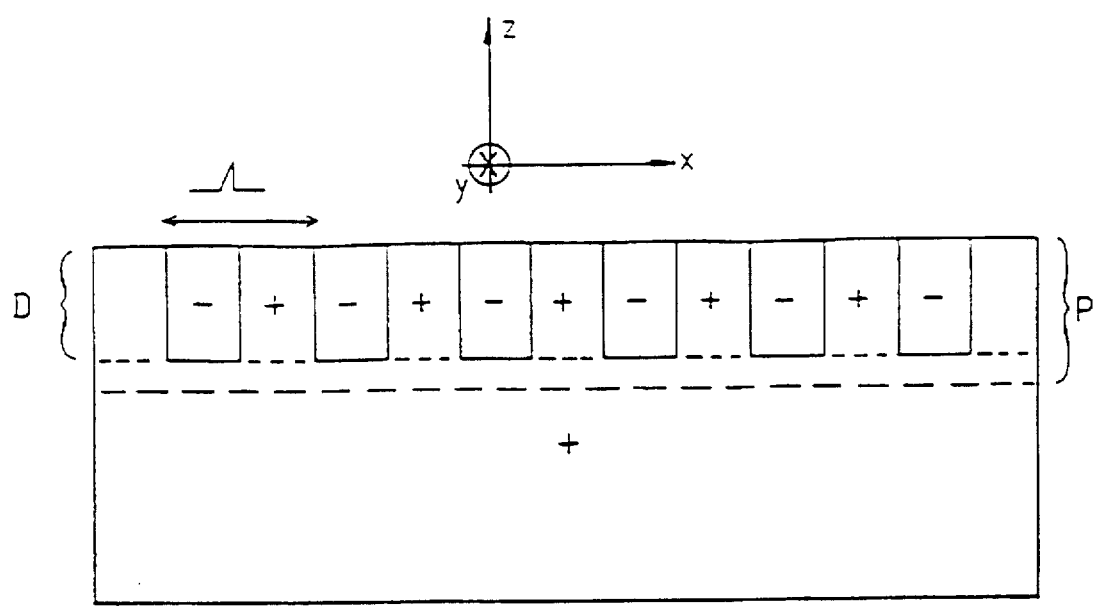
FIG. 1 shows diagrammatically a configuration of a frequency converter in which the guided modes extend over a depth P, greater than that according to which the phase-matching condition is satisfied.

In the case of $LiTaO_3$, the most common technique for producing this reversal locally consists firstly in carrying out an exchange between $Li^+$ ions in the substrate and $H^+$ ions from an acid bath. Once this proton exchange has been performed, the treated substrate is annealed at a temperature close to the Curie point of the material. By using a mask at the exchange to confer the desired periodic character on the polarization reversal, it is possible to obtain, below the surface of the substrate, the ferroelectric polarization image depicted in FIG. 1. The depth D at which the periodic character is appreciable depends on the pitch Λ, this being related to the technique used for achieving the reversal.

Experimentally, it is observed that a pitch of about 3.5 µm, which makes it possible to ensure the condition of virtual phase matching (VPM) for an emission in the blue by frequency doubling, limits the depth D to 2 µm.

It is therefore necessary to produce a waveguide allowing sufficient confinement within the thickness of 2 µm.

Figure 2:
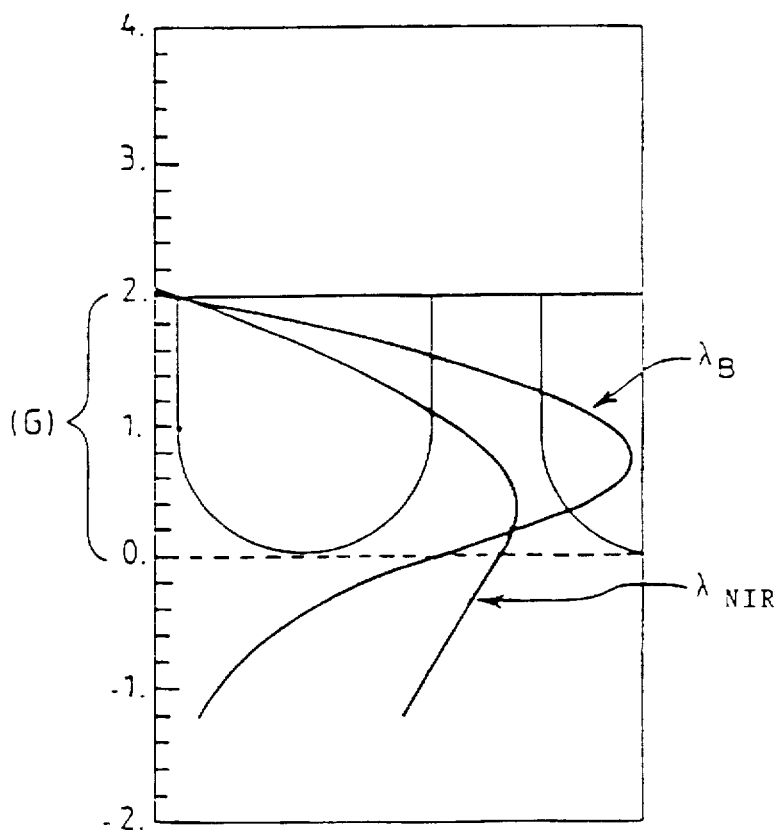
FIG. 2 illustrates the propagation of the guided modes at wavelengths $\lambda_{NIR}$ (near infra-red) and $\lambda_B$ (blue) within the guide inscribed at the surface of the non-linear substrate used in a frequency converter according to the prior art, without a symmetrization layer.
Figure 3:
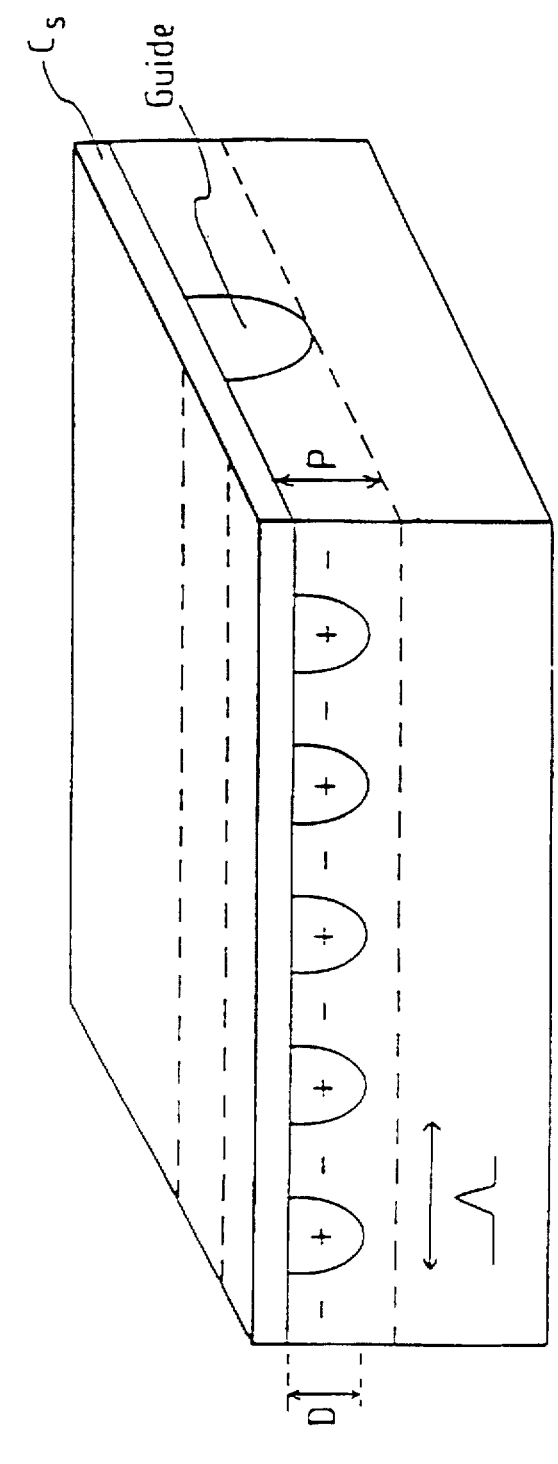
FIG. 3 shows diagrammatically a frequency converter which includes a symmetrization layer.
Figure 4:
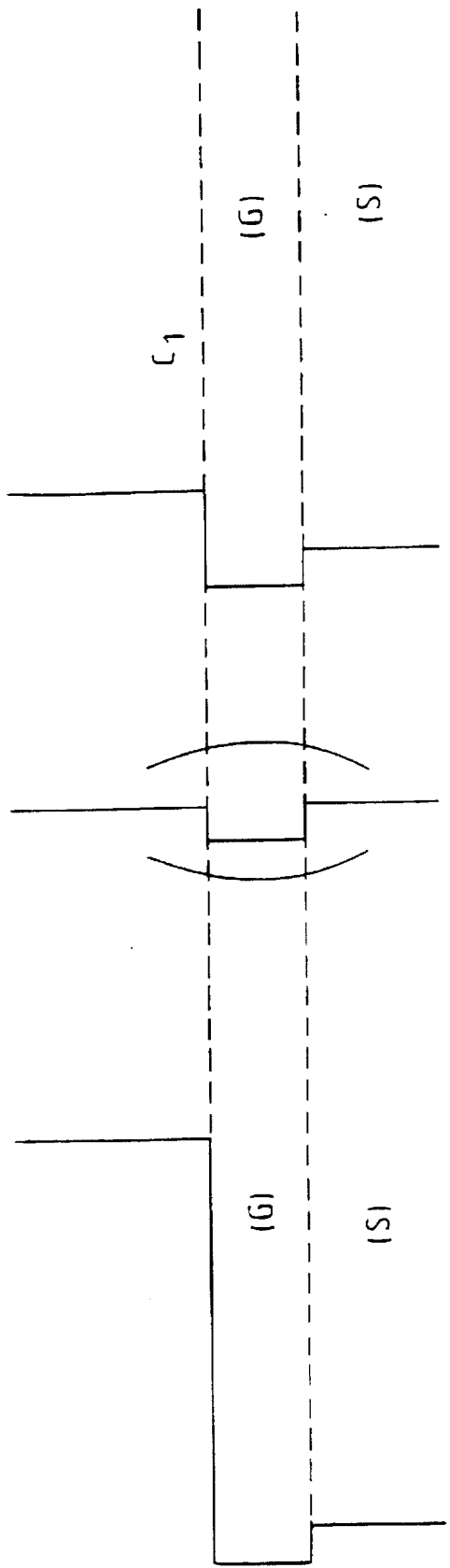
FIG. 4 illustrates various index profiles in the following cases.

In order to try to achieve this objective in practice, the only known way on this material for this type of application consists in carrying out a second proton exchange through a mask in order to raise the refractive index locally. It is then possible to obtain a guide as shown diagrammatically in FIG. 1, with a depth P. Clearly, if the technique used for producing this guide could lead to a very high index difference compared with the substrate (for example between 0.01 and 0.1), the confinement within the thickness D=2 µm of waves lying in the near infra-red or in the visible would cause no problem. In practice, although the proton exchange does make it possible to obtain index differences greater than 0.01 in LiTaO$_3$, they are accompanied in many cases by a very substantial decrease in the non-linear coefficient of the material (it should be noted that this phenomenon is even better understood in LiNbO$_3$). Thus, in order to maintain the value of the non-linear coefficient which occurs in quadratic form in the conversion yield, it is necessary to produce guides having index differences compared with the substrate of the order of a few $10^{-3}$. The confinement of the waves is then insufficient to take best advantage of the volume of the material in which the periodic character necessary for phase matching is appreciable. This may be seen in FIG. 2 which depicts the electric-field profiles of the fundamental mode of the guide (G) in the near infra-red ($\lambda_{NIR}$=860 nm) and of the fundamental mode of the guide in the blue ($\lambda_B$=430 nm). 430 nm). As we already mentioned, we will limit ourselves here to a conversion from the former to the latter. For this FIG. 2, we considered a guide of depth 2 µm having a homogeneous index difference 0.004=$\Delta n_{H+}$ greater than the substrate (S) both in the near infra-red and in the blue ($\Delta n_{H+}$=$\Delta n_{H+/NIR}$=$\Delta n_{H+/B}$), the indices of the substrate at the two wavelengths in question being 2.15 (=$n_{SUB/NIR}$ and 2.26 (=$n_{SUB/B}$). In particular, still in FIG. 2, it may be observed that the maximum in the electric field for the two modes in question lies in the bottom part of the region in which the periodic nature of the non-linear coefficient is appreciable. This is due to the combination of a low value for $\Delta n_{H+}$ and the disymmetry of the guiding structure, the index profile of which is shown diagrammatically in FIG. 4a. The solution adopted in the invention consists in resymmetrization of the guide by depositing on the specimen a dielectric layer whose index is close to that of the substrate (as illustrated in FIG. 3), this layer having to act as a superstrate, replacing air, in order to end up with the index profile depicted in FIG. 4c, the profile b) in brackets depicting the ideal symmetrization case.

More specifically, taking a guide width of 4 µm, a non-linear coefficient of 20 µm/V and a pump wavelength of 860 nm, a normalized conversion yield η of 19%/W.cm$^2$ is therefore obtained with the guiding structure without a symmetrization layer. This yield is commonly accepted for characterizing the local non-linear efficiency within a guide (10%/W.cm$^2$ corresponding to 1 mW generated over 1 cm of interaction for 100 mW of pump).

Using a Ta$_2$O$_5$ symmetrization layer deposited on the LiTaO$_3$ substrate, we have a favourable configuration for concentrating the guided modes in the non-linear region.

In fact:

$\Delta n_{sNIR}$=$\Delta n_{sB}$=$\Delta n_s$=-0.08 where $\Delta n_{sNIR}$ and $\Delta n_{sB}$ represent the index differences between the deposited symmetrization layer and the substrate, in the near infra-red and the blue, respectively, these differences being very close to the ideal case in which they would be zero.

FIG. 5 illustrates the variation in the yield η of the guiding structure in question as a function of the thickness of the Ta$_2$O$_5$ symmetrization layer.

A notable improvement in the yield may be observed, which may reach a value of about 73%/W.cm$_2$, representing virtually a 4-fold increase with respect to the yield corresponding to the original structure. It is also important to note that, above a certain thickness, in this case about 0.5 µm, the yield no longer depends on this thickness. This behaviour, due to the fact that a deposited layer acts effectively as a superstrate, that is to say that its effect on the propagation conditions is the same as that of a layer of infinite thickness, affords great production flexibility by allowing a summary control of the thickness deposited. This would not, however, be the case with a dielectric symmetrization layer for which $\Delta n_s$ would be greater than 0.

This is because, in this case, the deposited layer can, above a sufficient thickness, act as a guiding region and confine the modes outside the region in which the periodic nature is appreciable.

The notable gain seen in FIG. 5 has been validated experimentally using the frequency doubler whose main production steps, starting from an LiTaO$_3$ substrate, as described hereinbelow.

Periodic reversal of the ferroelectric polarization leading to modulation of the sign of the non-linear coefficient
  * Proton exchange in a bath of pyrophosphoric acid at 260° C. for 30 min
  * Rapid anneal at 590° C. for 15 sec
Removal of the periodic index difference due to the above proton exchange
  * Anneal at 400° C. for 4 h
Production of the waveguide
  * Proton exchange in a bath of pyrophosphoric acid at 260° C. for 30 min
  * Anneal at 400° C. for 5 min.

Using the specimen produced according to this technique, we measured a normalized yield of 15%/W.cm$^2$ in a guide of 4 [lacuna] in width. After depositing a Ta$_2$O$_5$ layer produced by reactive sputtering of tantalum under oxygen, the yield increased to 45%/W.cm$^2$. It is important to note that, in addition to the notable increase in the yield, verified experimentally here, the deposition of a dielectric layer intended to act as the superstrate for the guiding structure, allows optical isolation of the interacting modes on the outside. Thus, the doubler, and more generally the frequency converter, is made far less sensitive to the mechanical attacks to which it may be subjected (scratches, condensation during cooling, etc.). In addition, although the various technological steps have revealed defects on the surface of the substrate, their effect in terms of scattering during propagation is markedly lessened, since the index difference characterizing the interface, which is scattering, is itself decreased by the deposition.

In order to increase the conversion efficiency further, the invention also proposes to introduce a guide-extension layer $C_{ex}$ of thickness $e_{ex}$ and of index $n_{eg}$. Indeed, in order to further increase the optical confinement in the region lying just below the surface of the substrate, that is to say in the region in which the modulation of the non-linear coefficient is effective, it is possible artificially to increase the thickness of the guide produced by proton exchange, here, too, using a dielectric layer deposited on the substrate. In order to play its part, this layer must have, at the various wavelengths in question, an index which is not only greater than those of the substrate and superstrate but also greater than the effective indices of the interacting modes. In FIG. 6c, the latter condition is fulfilled immediately since the extension layer has an index greater than that of the guide ($\Delta n_{h+}$<$\Delta n_{eg}$, where $\Delta n_{eg}$ represents the difference between the index of the guide-extension layer and that of the substrate). It is this situation which will be intended in practice to ensure that this layer plays its part properly, although the ideal solution would consist in depositing a layer of index equal to that of the guide ($\Delta n_{H+}=\Delta n_{eg}$) which corresponds to the situation depicted in brackets in FIG. 6b. Nevertheless, given the very low value of $\Delta n_{H+}$ and the limited number of materials available, there would be a great risk of the index of the extension layer falling below that of the guide. In FIG. 6c, if the symmetrization layer has been maintained, this is precisely because its advantage, in terms of conversion efficiency, remains when the extension is produced using a layer of index much greater than that of the guide. If $\Delta n_{H+}=\Delta n_{eg}$, the symmetrization layer has virtually no effect on the conversion yield, but it does maintain its function of optically isolating the guided modes with respect to the outside. It is for this reason that it has been maintained (with a thickness of 0.5 μm) in the numerical examples which are to follow. The first of these examples relates to the ideal case in FIG. 6b, namely:

$$\Delta n_{ef}=\Delta n_{H+}=0.004$$

In this case, FIG. 7 gives the variation in the normalized conversion yield η as a function of the thickness e of the guide-extension layer, the other parameters being the same as those used for FIGS. 3 and 5. It may be observed that an optimum thickness exists between 0.9 and 1.0 μm, for which the yield exceeds 200%/W.cm². This represents a factor of more than 20 with respect to the situation in which no layer has been deposited (19%/W.cm²).

Let us now take the example, which is more realistic in practice, in which the index of the extension layer is greater than the index of the guide produced by proton exchange:

$$\Delta n_{ef}=0.05 \text{ (still with } \Delta n_{H+}=0.004)$$

FIG. 8 indicates the variation in the yield as a function of the thickness $e_{ex}$. This variation reveals three different regimes. Regime 1 corresponds to the desired objective, that is to say to the increase in the yield by guide extension (almost 120%/W.cm² at the peak). In the case of regime 2, given the fact that the harmonic wavelength is much shorter than the pump wavelength, the thickness of the extension layer is such that the latter by itself constitutes a guide for the harmonic wave without this being the case for the pump wave. The two waves are then confined in different regions, which explains the significant decrease in the yield, which drops well below its value in the absence of the extension layer. As the thickness of this extension layer continues to increase, the pump wave in turn may be confined therein. This gives rise to regime 3 in which the pump and harmonic waves are both confined in the extension layer, that is to say outside the region in which the non-linear coefficient is modulated. VPM-enhanced frequency conversion occurs only because of the overlap between this region and the evanescent parts of the pump and harmonic modes.

In the configuration we have chosen, the extension layer may, for example, consist of $Nb_2O_5$, then have:

$$\Delta n_{ef}=0.10$$

which gives the variation in the yield β as a function of the thickness $e_{ex}$, described by FIG. 9. Although regime 1 remains of interest since it allows the yield to exceed 100%/W.cm², regime 3 leads to a value greater than 120%/W.cm². The profile of the interacting fields is given in FIG. 10b), FIG. 10a) repeating, for comparison, the case of FIG. 2 in which no layer has been deposited.

If we continue to increase the index of the extension layer, the tendency which has just been demonstrated is confirmed.

This may be seen from FIG. 11, which depicts the same variation as the previous figures, but with:

$$\Delta n_{ef}=0.20$$

In this FIG. 11, it may be seen that regime 1 now gives rise only to a yield of approximately 100%/W.cm² whereas regime 3 leads to a value greater than 210%/W.cm². In this case, the low value of $\Delta n_{H+}$(0.004) now has only a negligible effect on the propagation conditions. Making this value zero, that is to say not producing a guide by proton exchange before depositing the dielectric layers, would hardly change the value of the yield.

This is why the subject of the invention is also a frequency converter in which a guide is produced outside the region of the substrate in which the non-linear coefficient is modulated in terms of sign.

Depicted in FIG. 11 is the variation in the conversion yield as a function of the thickness $e_{ex}$ of the extension layer in the case $\Delta n_{H+}=0$, that is to say without having produced a guide by proton exchange before depositing the dielectric layers ($\Delta n_{eg}$ is still equal to 0.20). As expected, this absence of a proton guide does not change the high yield obtained in regime 3. This represents a very important point since it becomes possible to get round the problem of the presence of protons in the region in which the material forming the substrate is actually used for its non-linear properties, that is to say in the region in which the non-linear coefficient is modulated. In point of fact, this presence of protons is known to actually decrease this coefficient, the influence of which on the conversion yield is quadratic. It is true that the periodic reversal of the ferroelectric polarization, which leads to the modulation in the non-linear coefficient, is obtained using a proton exchange. However, from this exchange no local increase in index is allowed. Indeed, on the contrary, such an increase constitutes a parasitic modulation which it is desired to eliminate by a long anneal (4 h at 400° C.), which is assumed also to restore the initial value of the non-linear coefficient, this step of course being inconceivable when appreciable index difference has to be maintained, in particular when the optical guiding function is intended. There remains the question of lateral confinement. If the modes are guided by the proton exchange, this confinement (in the direction Oy in FIG. 1) is obtained directly by a lateral localization of this exchange which is therefore produced through a mask in the form of a stripe. Thus the cross section of the guides produced may be drawn diagrammatically as in FIG. 12 depending on whether the guide is:

a) bare (no dielectric layer)

b) provided with a symmetrization layer c) provided with an extension layer and a symmetrization layer.

In the case which gets round the problem of using proton exchange for the optical guiding, which now is obtained only by the extension layer, a "ridge"-type geometry, produced by partial and localized ablation of the symmetrization layer, is perfectly suitable for obtaining lateral confinement. The latter possibility is illustrated by diagram d) in FIG. 12.

Throughout the foregoing, we have dealt preferably with conversion between modes of the same kind (fundamental modes both for infrared wavelengths and for wavelengths forming part of the blue region of the spectrum). In terms of phase matching for an operation of frequency conversion in a waveguide, it is actually more favourable for the modes corresponding to the shorter wavelengths to be of a higher order than those associated with the longer wavelengths, the modal dispersion then making it possible to compensate for all or part of the dispersion in the refractive indices. However, if this causes a problem in the case of emission in the blue, by frequency doubling, in which this must occur in a fundamental mode of the guide, the approach is different in the case of an integrated-optics parametric oscillator (IOPO) in which the waves are generated at a wavelength longer than that of the pump which may therefore advantageously be confined in a 2nd-order mode. Thus, for applications of the IOPO type, based on VPM, the invention makes it possible to decrease very substantially the threshold expected of such a converter produced on $LiTaO_3$ or $LiNbO_3$, in order to tend towards the mW within the framework of diode pumping towards 0.8 μm via a 2nd-order mode and of emission around 1.5 μm in fundamental modes of the guide. This is possible since the invention consists in fact in separating the solutions provided for the overlap integral phase-matching problems even if the approach is the same in both cases: a periodic structure for the phase-matching and discreet dielectric layers for the overlap. To conclude, stacking dielectric layers on a guiding structure which may or may not exist beforehand makes it possible to compensate for the difference in the vector k in the direction perpendicular to that of propagation.

We claim:

1. Frequency converter comprising a guide of refractive index $n_g$, supplied by one or more light waves of frequency $\omega_n$, also comprising a non-linear medium (NLM) of index $n_s$ (less than $n_g$) in which the condition for phase matching between non-linear polarization generated by incident waves and created waves at frequencies $\omega_{em}$ is satisfied over a depth D of the non-linear medium by periodic modulation of a parameter involved in the non-linear interaction, said depth being defined in a plane perpendicular to an axis of propagation of the incident and created waves, said waves being confined in the two directions perpendicular to their axis of propagation, and said waves having spatial overlap in the plane perpendicular to the axis of propagation of said waves, on the one hand of a non-linear polarization generated by the $k_i$th-order guided modes of the incident waves and on the other hand of the $l_j$th-order guided modes of the created waves, characterized in that:

the converter comprises a layer $C_{ex}$ lying at the surface of the non-linear medium, said layer $C_{ex}$ having an index $n_{eg}$ close to the index $n_g$ of the guide, and a second layer $C_1$ of refractive index N lying above the layer $C_{ex}$, wherein the layer $C_1$ is a symmetrization layer of refractive index less than $n_g$ and close to $n_s$ so as to increase the spatial overlap of the non-linear polarization in a region lying above the depth D of the medium (NLM) generated by the fundamental modes of the incident waves and the fundamental modes of the created waves.

2. Frequency converter according to claim 1, characterized in that it comprises a layer $C'_{ex}$ of index $n_g$, the variation in index $n_g$ and $n_s$ being such that the two-dimensional confinement of the guided modes is provided at the $C'_{ex}$ layer/medium (NLM) interface by a ridge within the layer $C_1$.

3. Frequency converter according to claim 2, characterized in that the lateral confinement is provided by a ridge in the region of the layers $C_1$ and $C'_{ex}$.

4. Frequency converter according to claim 3, characterized in that the medium (NLM) is made of $LiTaO_3$.

5. Frequency converter according to claim 2, characterized in that the medium (NLM) is made of $LiTaO_3$.

6. Frequency converter according to claim 1, characterized in that the medium (NLM) is made of $LiTaO_3$.

7. Frequency converter according to claim 1, characterized in that the layer $C_1$ is made of $Ta_2O_5$.

8. Frequency converter according to claim 1, characterized in that the layer $C_{ex}$ is made of $Nb_2O_5$.

9. Frequency converter according to claim 1, characterized in that the layer $C_{ex}$ is made of $TiO_2$.

10. Frequency converter according to claim 1, characterized in that the guide is a planar guide which is not laterally confined in the medium (NLM) in the region in which the phase-matching condition is satisfied, the lateral confinement being provided by an additional thickness of the layer $C_1$.

* * * * *